(12) United States Patent
Ogale

(10) Patent No.: US 9,201,424 B1
(45) Date of Patent: Dec. 1, 2015

(54) CAMERA CALIBRATION USING STRUCTURE FROM MOTION TECHNIQUES

(71) Applicant: Google Inc., Mountain View, CA (US)

(72) Inventor: Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/010,937

(22) Filed: Aug. 27, 2013

(51) Int. Cl.
*G05D 1/08* (2006.01)
*G05D 1/00* (2006.01)

(52) U.S. Cl.
CPC .................................. *G05D 1/0094* (2013.01)

(58) Field of Classification Search
None
See application file for complete search history.

(56) References Cited

U.S. PATENT DOCUMENTS

| | | | |
|---|---|---|---|
| 7,440,585 B2 | 10/2008 | Roh | |
| 7,840,352 B2 | 11/2010 | Strelow | |
| 8,305,430 B2 | 11/2012 | Oskiper | |
| 2008/0310757 A1 | 12/2008 | Wolberg | |
| 2009/0290032 A1* | 11/2009 | Zhang et al. | 348/211.9 |
| 2011/0096165 A1* | 4/2011 | Zeng et al. | 348/148 |
| 2011/0282622 A1* | 11/2011 | Canter | 702/150 |
| 2012/0007985 A1* | 1/2012 | Inui et al. | 348/148 |
| 2012/0120072 A1* | 5/2012 | Se et al. | 345/420 |
| 2012/0173185 A1* | 7/2012 | Taylor et al. | 702/104 |
| 2012/0308114 A1 | 12/2012 | Othmezouri | |
| 2013/0070962 A1* | 3/2013 | Yankun et al. | 382/103 |
| 2014/0043473 A1* | 2/2014 | Gupta et al. | 348/135 |

\* cited by examiner

*Primary Examiner* — John R Olszewski
*Assistant Examiner* — Jess Whittington
(74) *Attorney, Agent, or Firm* — McDonnell Boehnen Hulbert & Berghoff LLP

(57) ABSTRACT

Example methods and systems for camera calibration using structure from motion techniques are described herein. Within examples, an autonomous vehicle may receive images from a vehicle camera system and may determine an image-based pose based on the images. To determine an image-bases pose, an autonomous vehicle may perform various processes related to structure from motion, such as image matching and bundle adjustment. In addition, the vehicle may determine a sensor-based pose indicative of a position and orientation of the vehicle through using information provided by vehicle sensors. The vehicle may align the image-based pose with the sensor-based pose to determine any adjustments to the position or orientation that may calibrate the cameras. In an example, a computing device of the vehicle may align the different poses using transforms, rotations, and/or scaling.

17 Claims, 5 Drawing Sheets

CAMERA CALIBRATION USING STRUCTURE FROM MOTION TECHNIQUES

BACKGROUND

Unless otherwise indicated herein, the materials described in this section are not prior art to the claims in this application and are not admitted to be prior art by inclusion in this section.

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between. Different vehicles may require different forms of assistance from systems and/or the user.

Such vehicles are typically equipped with various types of sensors in order to detect objects in the surroundings. For example, an autonomous vehicle may include lasers, sonar, RADAR, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle. The various vehicle systems and sensors may require calibration periodically to ensure accurate results.

SUMMARY

Within examples, devices and methods for camera calibration using structure from motion techniques are provided.

In one example, a method is provided that comprises receiving, via a camera coupled to a vehicle, one or more images. The method may further comprise based on the one or more images, determining an image-based pose indicative of an orientation and position of the camera. The method may also include determining, via at least one sensor coupled to the vehicle, a sensor-based pose indicative of an orientation and position of the vehicle. The method may further comprise aligning the image-based pose with the sensor-based pose. The method may also comprise determining an adjustment of the orientation or position of the camera based on the alignment of the image-based pose with the sensor-based pose. The method may comprise providing instructions to one or more systems of the vehicle to configure the camera based on the adjustment.

In another example, a non-transitory computer readable storage medium having stored therein instructions, that when executed by a computing device, cause the computing device to perform functions. The functions may comprise receiving, via a camera coupled to a vehicle, one or more images. The functions may further comprise based on the one or more images, determining an image-based pose indicative of an orientation and position of the camera. The functions may also include determining, via at least one sensor coupled to the vehicle, a sensor-based pose indicative of an orientation and position of the vehicle. The functions may further comprise aligning the image-based pose with the sensor-based pose. The functions may also comprise determining an adjustment of the orientation or position of the camera based on the alignment of the image-based pose with the sensor-based pose. The functions may comprise providing instructions to one or more systems of the vehicle to configure the camera based on the adjustment.

In still another example, a system is provided that comprises at least one processor, and data storage comprising instructions executable by the at least one processor to cause the system to perform functions. The functions may comprise receiving, via a camera coupled to a vehicle, one or more images. The functions may further comprise based on the one or more images, determining an image-based pose indicative of an orientation and position of the camera. The functions may also include determining, via at least one sensor coupled to the vehicle, a sensor-based pose indicative of an orientation and position of the vehicle. The functions may further comprise aligning the image-based pose with the sensor-based pose. The functions may also comprise determining an adjustment of the orientation or position of the camera based on the alignment of the image-based pose with the sensor-based pose. The functions may comprise providing instructions to one or more systems of the vehicle to configure the camera based on the adjustment.

These as well as other aspects, advantages, and alternatives, will become apparent to those of ordinary skill in the art by reading the following detailed description, with reference where appropriate to the accompanying figures.

DETAILED DESCRIPTION

Figure 1:
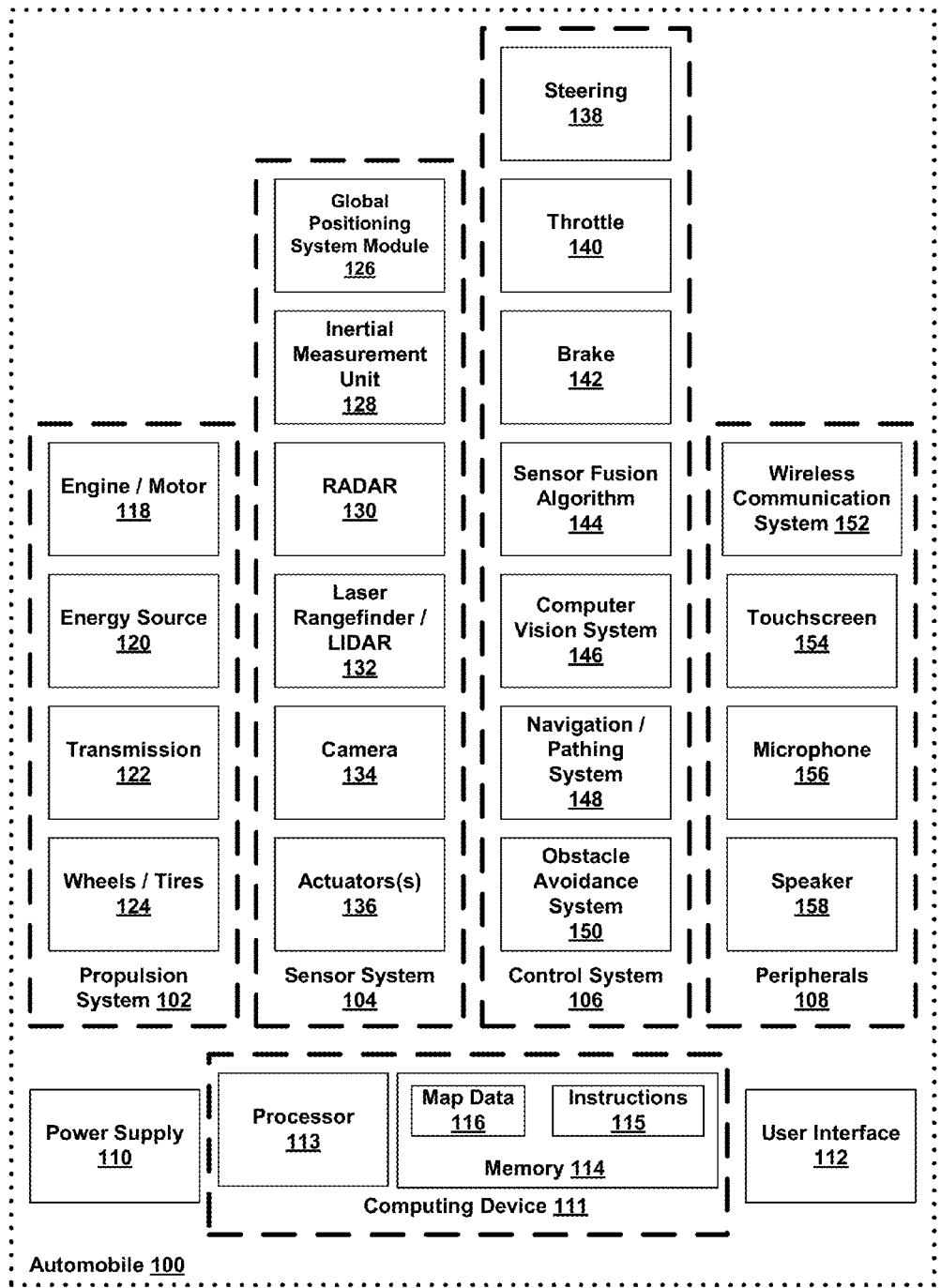
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems are provided for camera calibration using structure from motion techniques. The methods and systems may include calibrating cameras situated on a driverless vehicle using various processes and/or software applications, such as functions including structure from motion. An autonomous vehicle may calibrate the various vehicle cameras without the application of any special calibration objects or prearranged calibration layout.

As an example of calibrating cameras using structure from motion techniques, a self-driving car (e.g., autonomous vehicle) may navigate a path of travel (e.g., a curved road) while analyzing images captured and provided by a vehicle camera system. The autonomous vehicle may additionally utilize other information provided by a vehicle sensor system, which may include various components, systems, and/or sensors. During operation and/or travel, the autonomous vehicle may calibrate individual cameras within the vehicle camera system based on comparing information provided by the cameras within images and information provided by the various vehicle sensors. A computing device or system associated with the autonomous vehicle may align and/or compare the information provided about an object or objects by the cameras and other sensors. In some cases, the computing device or system may adjust the orientation and/or position of multiple cameras along with possible other parameters (e.g., intrinsic parameters) based on information provided about the environment based on poses of objects determined by a camera and poses of the same objects according to information provided by the vehicle sensors. For example, an autonomous vehicle may determine the pose of an object according to the various images captured by the camera system (e.g., an image-based pose). Such an image-based pose may be indicative of various parameters associated with the cameras, such as the orientation of individual cameras or position of the cameras relative to the vehicle. The pose may include orientation information (e.g., roll, pitch, yaw) and position information (e.g., X-Y-Z coordinates) in three dimensions.

In addition, the autonomous vehicle may determine another pose based on parameters associated with the vehicle through using information provided by the vehicle sensor system (e.g., a sensor-based pose). The autonomous vehicle may accumulate information about the vehicle's environment including range information regarding objects from the different vehicle sensors. The sensor-based pose may describe the orientation of the vehicle, the position of the vehicle, and/or other parameters (e.g., speed or elevation) of the vehicle. In some implementations, the sensor-based pose may be based on the vehicle's position and/or orientation relative to an object or objects in the vehicle's environment. The object or objects used by a computing device or system of the vehicle to determine the sensor-based pose may be the same objects that the camera system captured to determine the image-based pose. Using the same objects may provide additional ways to compare and calibrate the cameras directly. In some cases, the autonomous vehicle may determine additional poses of other objects.

In some instances, the determined image-based pose and sensor-based pose may be based on different coordinate systems. The computing device or system of the autonomous vehicle may use different coordinate systems to display and analyze the range data and other information provided by the determined poses. In order to determine if the autonomous vehicle may need to calibrate any cameras, the autonomous vehicle may use various means to extract information relative to differences between the poses as provided by the camera system and as provided by the vehicle sensors. The computing device may use bundle adjustment subsequent to image matching in order to extract an image-based pose. The bundle adjustment process may allow a computing device to determine an image-based pose that is based on a set of images provided by all cameras within the vehicle's camera system or using a single camera or subset as well.

Within examples, an autonomous vehicle may utilize different transforms, rotations, and/or scaling to align the determined poses, which may each be based originally on different coordinate systems. For example, the autonomous vehicle may align the coordinate system of the image-based pose onto the coordinate system of the sensor-based pose through the use of transforms, rotations, and/or scaling. In some instances, an autonomous vehicle may align different poses based on multiple coordinate systems, which may include determining a pose of an object based on an arbitrary coordinate system (e.g., structure from motion coordinate system). The computing device or system of the autonomous vehicle may use an intermediary coordinate system to assist in aligning the pose determined through information provided by camera images and the pose determined by vehicle sensors. The poses may be based on the same object or group of objects, for example.

In addition, the autonomous vehicle may use coordinate systems based on the cameras, the vehicle, or a global context, for example. Through aligning the image-based pose and the sensor-based pose, the autonomous vehicle may determine adjustments for the camera or cameras within the vehicle's camera system to calibrate the cameras to match the information provided by the vehicle sensors. The autonomous vehicle may determine a rotation (which may include roll, pitch and yaw) and translation of the camera relative to a position or orientation of the vehicle and/or based on the alignment of the different poses.

In order to perform the calibration process, a computing device or system of the autonomous vehicle may receive any number of images from a camera or cameras of the vehicle's camera system. The computing device may calibrate multiple cameras simultaneously using the same series or group of images. In an example implementation, an autonomous vehicle may determine an image-based pose using a subset of the total amount of images captured showing an object from a camera or cameras.

Furthermore, the autonomous vehicle may determine an image-based pose of an object or objects through the application of software and/or algorithms relating to structure from motion processes, such as image matching and bundle adjustment. For example, an autonomous vehicle may utilize image matching to identify useful images received from the vehicle's camera system that show a particular object rather than any unwanted images that would not provide useful information for calibrating a particular camera or cameras. In addition, the autonomous vehicle may apply a bundle adjustment process to the images in order to recover image pose or other information. The autonomous vehicle may perform bundle adjustment subsequent to performing image matching. Bundle adjust may use image matching to find the pose of the camera and the 3D shape of the objects being seen. In some examples, the autonomous vehicle may apply other functions in addition or replacing the image matching and/or bundle adjustment.

Given a set of images depicting a number of 3D points from different viewpoints, such as the images captured by the vehicle camera system as the vehicle travels, bundle adjustment may be defined as the problem of simultaneously refining the 3D coordinates describing the scene geometry as well as the parameters of the relative motion and the optical characteristics of the camera(s) used to capture the images, according to an optimality criterion involving the corresponding image projections of all points. An autonomous vehicle may apply bundle adjustment as the last step of a featured-based 3D reconstruction algorithm, which may occur subsequent to the selection process performed during image matching. The autonomous vehicle may apply a bundle adjustment function to minimize the reprojection error between the image locations of observed and predicted image points, which may be expressed as the sum of squares of a large number of nonlinear, real-valued functions. The autonomous vehicle may minimize the error through the use of various nonlinear least-square algorithms.

In examples, an autonomous vehicle may determine a sensor-based pose of an object or the vehicle. The sensor-based pose may describe the vehicle's orientation and/or other parameters (e.g., position) relative to an object or objects within the environment. In some instances, the sensor-based pose may provide an autonomous vehicle with information regarding the vehicle and an object or objects in the environment. For example, the autonomous vehicle may determine a vehicle orientation and position relative to an object through the use of vehicle sensors, such as a global positioning system (GPS), LIDAR, and RADAR, etc.

The computing device or system of the autonomous vehicle may provide instructions to other systems of the vehicle to configure the camera based on the adjustment. In some examples, the computing device may provide instructions to adjust multiple cameras. The instructions may include data for vehicle systems or components to adjust the orientation, position, or intrinsic parameters of cameras. In addition, the vehicle systems may be configured to adjust other parameters or properties associated with one or many cameras. Similarly, the computing device may provide additional instructions to vehicle systems to adjust parameters of a sensor as well.

In a specific example, an autonomous vehicle may be configured to navigate a short distance (e.g., 100 meters). While traveling, the camera system of the autonomous vehicle may capture an assortment of images via a camera system attached to the vehicle. The assortment of images may depict an object or objects in the environment of the vehicle from different angles and/or elevations due to the autonomous vehicle constantly changing position and/or orientation relative to the object during travel. Upon receiving the images, a computing device or system of the autonomous vehicle may determine an image-based pose based on the images using various functions relating to structure from motion, such as feature matching and/or bundle adjustment. The image-based pose may be based upon an object in the environment of the vehicle, such as a building or a bridge, for example. Other objects may serve as a signal point for developing an image-based pose.

Similarly, a computing device or system of the autonomous vehicle may be configured to determine a relative position of the vehicle through the use of vehicle sensors. For example, the computing device may receive information from various sensors to determine a sensor-based pose of the vehicle relative to the object that is captured in the images by the camera system. Through obtaining both poses, the computing device may align the image-based pose to match the vehicle-based pose. The computing device may use various alignment means, such as rotations, scaling, and/or transforms, etc., to align the image-based pose onto the vehicle-based pose. In some examples, the computing device may utilize one or more transforms to align the different coordinate systems of the camera and vehicle. Different vehicle systems or computational devices may be configured to implement the alignment means. Further, the autonomous vehicle may include memory to store past alignment results and track prior poses, results, etc.

Based at least in part on the alignment between the image-based pose and the vehicle-based pose, the computing device may determine adjustments to apply to the camera system that may alter the orientation and/or position of cameras to calibrate the cameras to provide images that accurately reflect the results as provided by the vehicle sensors.

Further information may be used to provide a higher confidence level or confirmation of calibrating various cameras within the cameras system of the autonomous vehicle. For example, an autonomous vehicle may receive information from different sensors to use for calibration. In some implementations, an autonomous vehicle may perform a secondary calibration process subsequent to the initial calibration process to determine if the adjustments made to a camera or cameras were accurate.

In such examples, the computing device or system of an autonomous vehicle may perform automatic extrinsic camera calibration periodically, on a predefined schedule, or continuously. The computing device may receive information from a sensor or system that provides that a camera or cameras require adjustment. The computing device may perform other calibration methods in addition to calibration using structure from motion functions. In some instances, the computing device may calibrate other systems or components in addition to the camera system based on the pose-comparison.

In another implementation, a computing device or system may use the structure from motion processes to provide a 3D point cloud for objects detected by a camera or cameras. By way, the 3D point cloud may be aligned by a computing device with the 3D point cloud as provided by other sensors (e.g., LIDAR) to further improve the accuracy of the calibration. The computing device may use the 3D point cloud comparison to perform calibration in real-time.

In addition, an example system may take the form of a non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
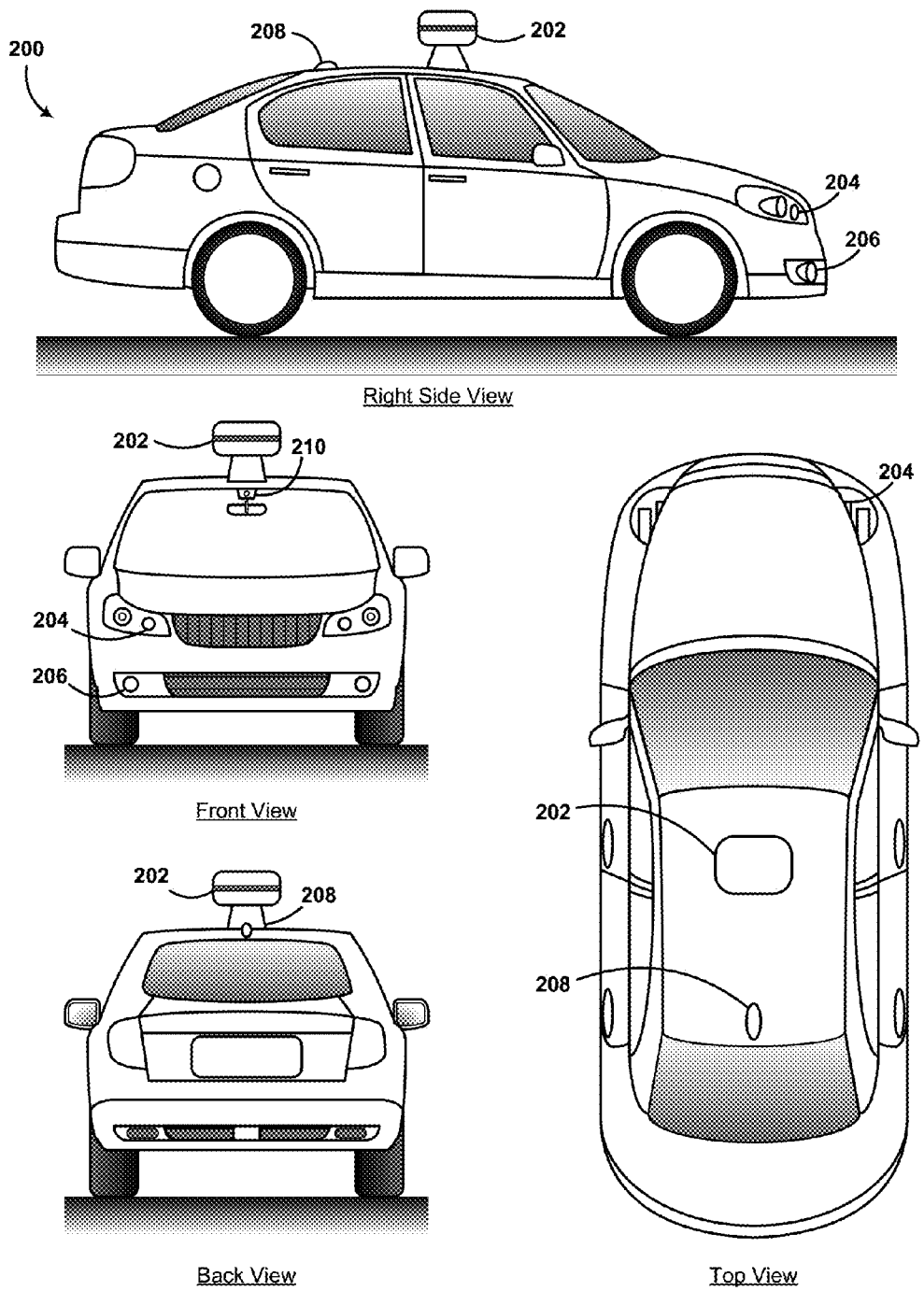
FIG. 2 depicts an example vehicle that can include all or some of the functions described in connection with the vehicle in reference to FIG. 1.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
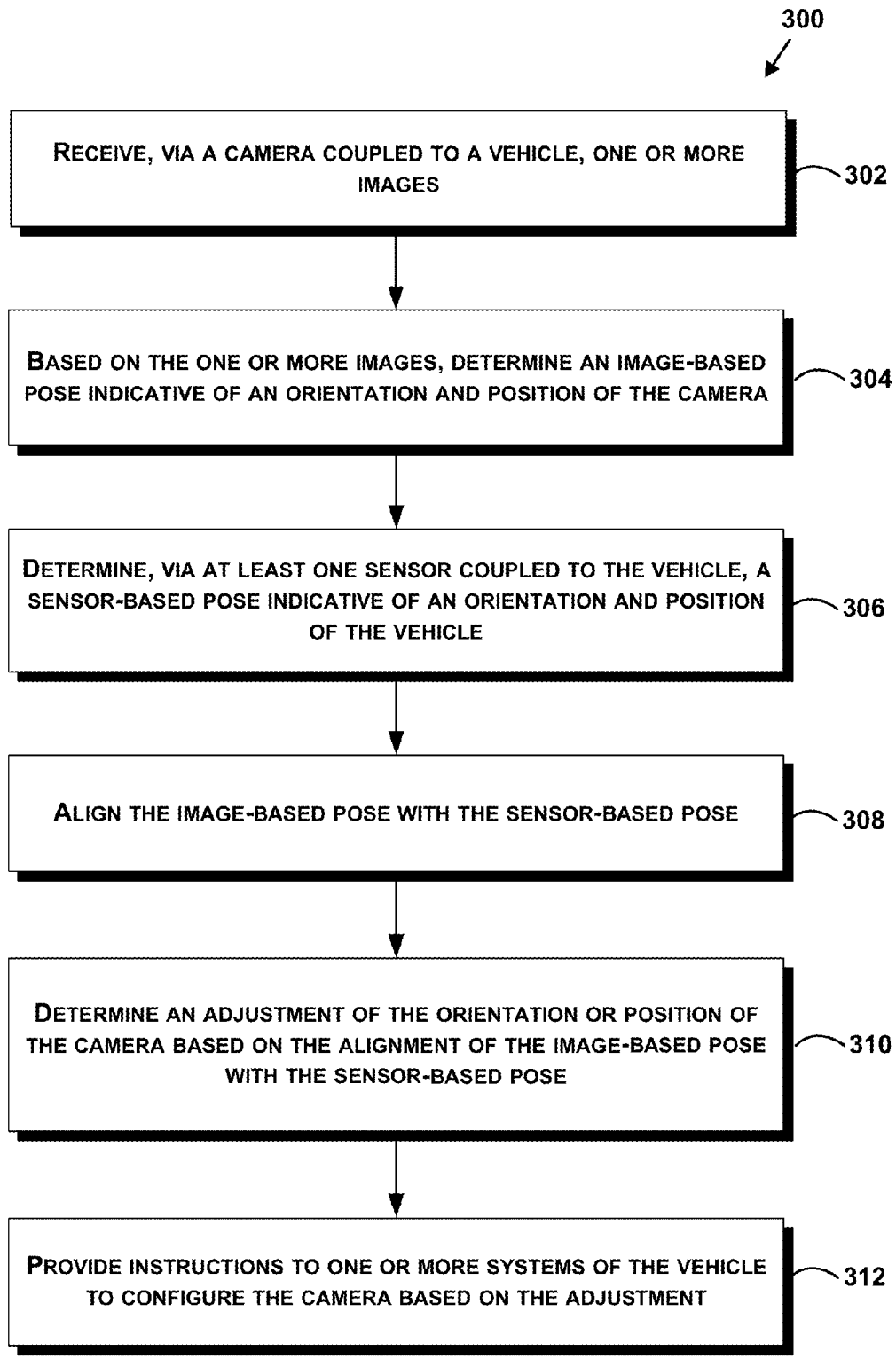
FIG. 3 is a block diagram of an example method for camera calibration using structure from motion techniques, in accordance with at least some embodiments described herein.

FIG. 3 is a block diagram of an example method for automatic extrinsic camera calibration using structure from motion, in accordance with at least some embodiments described herein. Method 300 shown in FIG. 3 presents an embodiment of a method that, for example, could be used with the vehicle 100 and/or vehicle 200 as illustrated and described in reference to FIGS. 1 and 2, respectively, or components of the vehicle 100 or vehicle 200. For example, the processes described herein may be carried out by the Global Positioning System 126, inertial measurement unit 128, RADAR unit 130, the LIDAR unit 132, or camera 130 mounted to an autonomous vehicle (e.g., vehicle 200) in communication with the computer device 111, the sensor fusion algorithm 144, and/or the computer vision system 146. Method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions (e.g., machine readable code) executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, a computer program product, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes receiving, via a camera coupled to a vehicle, one or more images. As previously discussed in FIGS. 1-2, an autonomous vehicle may include a camera system, which may contain a camera or multiple cameras. The camera system may be configured to capture images of the environment surrounding the autonomous vehicle. The cameras within the camera system may be configured to capture images in real-time and deliver the images to other systems of the autonomous vehicle. During operation, the camera system may be configured to focus upon and capture images of particular objects within the environment. For example, an autonomous vehicle may be equipped with a camera similar to camera 134 of vehicle 100 shown in FIG. 1.

The autonomous vehicle may include different types of cameras within the camera system. For example, the camera system may include range cameras, digital cameras, still cameras, omnidirectional cameras, or other types. The camera system may capture images and/or videos to transmit to a computing device or system associated with the autonomous vehicle. Further, the cameras may be configured to capture images that include various amounts of pixels. The cameras may include optical zoom and digital zoom and may include various sensitivity settings. A computing device or systems associated with the autonomous vehicle may receive the images from the camera system through a wired link or wirelessly. An autonomous vehicle may store the images within tangible memory, through sending the images to another entity, and/or within cloud storage.

In addition, each camera within the camera system may be positioned and/or orientated in different ways. The cameras may be spaced at different points around the vehicle. Likewise, the cameras may be orientated in a manner that allows the camera system to capture information pertaining to different portions of the local environment of the autonomous vehicle. For example, some cameras within the camera system may be orientated and/or positioned to capture images of lane markers to assist with lane identification. Cameras may be designated to capture images of particular objects. For example, a camera may be positioned and oriented to capture images of street signs, such as highway signs. Another camera may be positioned to track lane markers or curbs. Similarly, a camera may be positioned to focus upon the environment immediately in front of the vehicle. Other examples of camera positions and/or orientations may exist as well.

A computing device or system associated with an autonomous vehicle may be configured to determine the orientation and/or position of each camera. The computing device or system may track the camera system and determine when cameras may require extrinsic or intrinsic adjustment. Similarly, the computing device may determine other parameters associated with each camera. The cameras may be moved, adjusted, refocused, repositioned, calibrated, or may undergo other changes. For example, a computing device may control the lens-factor related to a camera and may cause the camera to zoom in on particular objects.

During operation, the camera system of an autonomous vehicle may capture images of various objects within the environment as the autonomous vehicle navigates a path of travel. The camera system may capture images in real-time and may capture multiple images simultaneously using different cameras. For example, an autonomous vehicle may be driving on a road while the camera system captures images of buildings, bridges, signs, or other objects. The camera system may be configured to focus and capture images for specific objects. The images captured by the camera system may show objects at different angles due to the movement of the vehicle. For example, the camera system may capture multiple images of a building with each image showing the building with slight variations due to the vehicle changing position relative to the building. In addition, the camera system may be configured to alter position or orientation during navigation to capture images of objects. The cameras may be also positioned in a manner to capture images of the environment periodically, regardless of any objects within the environment. Similarly, the cameras may be used to create panoramic images or other types of images.

The camera system of a vehicle may be configured to capture images of specific objects as the vehicle travels. For example, a camera system may capture a series of images of a building as the vehicle travels nearby the building. The series of images may display the building from different angles due to the vehicle changing position as the images are captured. The images may be indicative of the change of the position and orientation of the camera system of the autonomous vehicle as the vehicle changes position relative to objects in the environment.

In examples, the camera system may provide different sets of images to a computing system or device of a vehicle that pertain to different objects. The computing device or system of the autonomous vehicle may be capable of utilizing different sets of images to calibrate different cameras within the camera system. For example, an autonomous vehicle may capture two sets of images and use one set to calibrate cameras on the left side of the vehicle and the other set of images to calibrate the cameras of the right side of the vehicle. An autonomous vehicle may receive images from a single camera to focus upon calibrating that single camera. Other examples may exist as well.

At block 304, the method 300 includes based on the one or more images, determining an image-based pose indicative of an orientation and position of the camera. As an example, a computing device or system may determine an image-based pose based on the images received from the camera system. An autonomous vehicle may utilize functions and processes relating to structure from motion to determine an image-based pose from the images. A computing device or system may execute algorithms and/or software relating to image matching and/or bundle adjustment. For example, a computing device associated with the autonomous vehicle may utilize structure from motion processes to estimate 3D structures of objects from the 2D images displaying the objects. The computing device may analyze the different images captured of objects by the vehicle's camera system to determine estimated 3D structures of the objects. The computing device may use a subset of the images provided by the camera system.

A computing device or system associated with an autonomous vehicle may determine the pose of an object in an image, stereo images, or image sequence through pose estimation functions. The computing device or system may determine an image-based pose from a single image, stereo image pair, or a set of images. In some instances and/or applications, the computing device may factor the known speed of the vehicle as the images were captured. The pose of an object may describe various parameters of the object, such as the orientation, position, or other features. Further, the pose may be referred to as the exterior orientation and/or translation of the camera or images.

Within examples, an autonomous vehicle may determine a pose of some object or objects to allow for the adjustment of a camera or cameras according to the pose, The pose of an object may be described by means of a rotation, translation, and/or transformation which brings the object from a reference pose to the observed pose. An autonomous vehicle may determine an image-based pose that may be based on a camera-based coordinate system or another coordinate system. In such examples, a coordinate system may involve a system that uses coordinates to uniquely determine the position of a point or other geometric element on a manifold such as Euclidean space. The camera-based coordinate system may be based on various parameters associated with a camera or camera systems connected to the autonomous vehicle. For example, the camera-based coordinate system may include information relating to the orientation, position, direction of focus, or other parameters of the cameras relative to the vehicle and/or objects within the environment. In other examples, the autonomous vehicle may be configured to determine an image-based pose that is based on a different coordinate system or multiple coordinate systems.

A processor or other entity may determine an image-based pose. In some instances, a computing device may determine an image-based pose based on a specific object or objects within the environment of the vehicle. The computing device may identify and utilize images that include a specific object or objects from images that do not display the object. For example, an autonomous vehicle may receive images capturing different angles of a building. The different images of the building may be the result of the autonomous vehicle continuing to navigate a path of travel and the camera system moving relative to the building.

As an example of utilizing structure from motion functions, a computing device of the autonomous vehicle may use a feature matching application on the various images received from the camera system. For example, the computing device may use feature matching software to identify images that display the same object. By extension, the computing device may further use feature matching software or algorithms to identify and/or track particular features of an object across the different images displaying the object. Tracking features may allow the computing device to determine which images to use and which images to disregard for automatically calibrating the extrinsic parameters of a camera or cameras. For example, the computing device may track features, such as corners or line segments in a series of images based on a particular object or set of objects. In response to tracking features, the computing device may use the subset of images to further estimate motion and structure. In some instances, the computing device may be programmed to detect particular features of objects to use for tracking or may use previous scans to calibrate the tracking feature. Upon receiving the various images, an autonomous vehicle may be equipped to track sequences of images. The autonomous vehicle may include a system tracker or analysis program that extracts information from the images, including detecting and identifying common objects in sequences of images. In one example, an autonomous vehicle may include feature matching software that tracks common objects within images received from the camera system.

In addition, the computing device or system associated with the autonomous vehicle may receive the various images from the camera system and apply a search algorithm that groups the images based on particular parameters, such as size of object displayed. The computing device may differentiate between images displaying an object and images that do not display the object through the application of a feature matching algorithm or different means. For example, a computing device may execute an image matching algorithm that analyzes the various images received from the camera system to find all the images that display different angles of a particular building. Through application of an image-matching process, a computing device may identify images from the numerous images received that may be useful for calibrating a camera or cameras of the camera system.

In another example, a computing device or system associated with an autonomous vehicle may be configured to perform a bundle adjustment process to determine an image-based pose. The computing device may use bundle adjustment to minimize the reprojection error that may occur based on the image location of observed and predicted image points, which may be expressed as the sum of squares of a large number of nonlinear, real-valued functions. The autonomous vehicle may use nonlinear least-squares algorithms to execute bundle adjustment. As an example, a computing device may analyze the bundle of light rays from 3D points in the scene to images on the camera images. The computing device may further adjust camera positions and/or the 3D point positions given the defined bundle of light rays to minimize the overall error, which may include determining 3D positions so that the light ray bundle is accurate. The computing device may extract features from different images and match the features in image pairs. As such, the computing device may further create tracks to display the same feature (e.g., world point) as shown through the different images. The computing device may select images based on different locations or features.

In an example, an autonomous vehicle may use a Levenberg-Marquardt algorithm to iteratively linearize the function to minimize the neighborhood of the current estimate and include the solution of linear systems known as the normal equations. When solving the minimization problems arising in the framework of bundle adjustment, the normal equations may have a sparse block structure owing to the lack of interaction among parameters for different 3D points and cameras. This can be exploited to gain tremendous computational benefits by employing a sparse variant of the Levenberg-Marquardt algorithm, which may explicitly take advantage of the normal equations zeros pattern, avoiding storing and operating on zero elements. The computing device may utilize other algorithms or software processes to analyze the images to determine an image pose. An autonomous vehicle may use additional structure from motion processes to determine an image-based pose.

In another example implementation, an autonomous vehicle may use other least-square estimation of transformation parameters based on the images. The computing device may use the least-squares estimation of similarity transformation parameters between two point patterns.

At block 306, the method 300 includes determining, via at least one sensor coupled to the vehicle, a sensor-based pose indicative of an orientation and position of the vehicle. As an example, an autonomous vehicle may use a sensor system to determine a sensor-based pose. The sensor-based pose may be indicative of an orientation and/or position of the vehicle. In examples, the sensor-based pose may be indicative of other information pertaining to the vehicle, such as the vehicle's speed, elevation, and/or other parameters associated with the vehicle. Further, the sensor-based pose may be based on the position and/or orientation of the vehicle relative to a specific object or objects in the environment of the vehicle. For example, the sensor-based pose may be based on the position of the vehicle relative to an object, which may be also shown within the images captured by the camera system. The autonomous vehicle may also determine a sensor-based pose that is based on a global coordinate system, such as the specific location of the autonomous vehicle.

As shown by FIGS. 1-2, an autonomous vehicle may include a sensor system that provides information to a computing device or computer system of the vehicle. The computing device may utilize the information provided by vehicle sensors to assist in navigation or travel. For example, the computing device may provide instructions to the control system of the vehicle based on the information received from the sensor system.

An example sensor system of the vehicle may include different types of sensors, such as the sensor system 104 illustrated in FIG. 1. The sensor system may include a GPS module, inertial measurement unit, a RADAR unit, a LIDAR unit, cameras, actuators, gyroscopes, accelerometers, and/or other types of sensors, for example. The different types of sensors may provide different types of information, such as distances between objects and the vehicle, sizes and/or speed of objects.

Using information provided from the sensor system of the vehicle, a computing device or system of the autonomous vehicle may be configured to determine a sensor-based pose. The computing device may determine the sensor-based pose based on a vehicle-based coordinate system. The sensor-based pose and/or vehicle-based coordinate system may depend on and/or describe the position and/or orientation of the vehicle. In examples, the sensor-based pose and vehicle-based coordinate system may be based on the position of the vehicle relative to an object or objects. Similarly, the vehicle-based coordinate system may be the same as a global coordinate system that may be determined at least partially by a GPS module of the autonomous vehicle. The vehicle-based coordinate system may differ from the camera-based coordinate system and structure from motion coordinate system.

In a specific example, an autonomous vehicle may utilize different types of sensors to provide information about the environment to enable the vehicle to navigate paths accurately while avoiding collisions. The autonomous vehicle may include a sensor system that provides information to other systems within the vehicle, including the propulsion system, computer system or computing device, and control system. In addition, the autonomous vehicle may be equipped with sensors, including but not limited to, a LIDAR unit, RADAR system, GPS, etc. The different sensors may be configured to provide information to the autonomous vehicle. For example, an autonomous vehicle, such as vehicle 100, may be equipped with a sensor system (e.g., sensor system 104). The sensor system 104 illustrated in FIG. 1 includes a global positioning system 122, a precipitation sensor 123, an inertial measurement unit 124, a RADAR unit 126, a LIDAR unit 128, camera 130, and microphone 131. In other implementations, an autonomous vehicle may include additional types of sensors.

During operation, a computing device associated with the autonomous vehicle may receive information from vehicle sensors and determine a sensor-based pose based on the information. The sensor-based pose may be indicative of an orientation of the vehicle. In other examples, a computing device may determine a sensor-based pose that may be indicative of other parameters of the vehicle, including but not limited to position, location, speed, or other information. An autonomous vehicle may utilize an internal vehicle coordinate system with inertial measurement units or sensors that may keep precise track of the vehicle orientation and location. The autonomous vehicle may use the information to assist in the calibration various parameters of vehicle cameras.

In an example implementation, an autonomous vehicle may measure its orientation and/or position using an acceleration sensor and/or a magnetic flux sensor. An autonomous vehicle may utilize a series of GPS measurements to determine a position of the vehicle over a period of time. Similarly, the autonomous vehicle may determine the vehicle's position in real-time using a GPS module, LIDAR returns, or RADAR scans, for example.

The computing device may determine the sensor-based pose of the vehicle in real-time without reliance on determining an image-based pose using the camera system. In such examples, the computing device may constantly monitor the orientation and/or other parameters of the vehicle relative to some objects or context based on information provided by vehicle sensors. In other examples, the autonomous vehicle may determine a sensor-based pose based on a cue provided by the computing device in response to determining an image-based pose using camera images. The sensor-based pose may be based on information relative to the image-based pose, such as utilizing the same object or objects to determine poses.

At block 308, the method 300 includes aligning the image-based pose with the sensor-based pose. Within examples, an autonomous vehicle may perform processes and/or functions to allow the computing device to align and compare the image-based pose as according to the images and the sensor-based pose. The computing device may utilize various systems to perform different processes to align the poses. The computing device or another entity associated with the autonomous vehicle may receive the different estimated poses and apply alignment means to align the poses. For example, the computing device may scale, transform, rotate, or use other means to align the determined image-based pose as estimated using camera images with the sensor-based pose as determined through analyzing the information provided by vehicle sensors.

In such examples, a computing device may determine an image-based pose and sensor-based pose based on different coordinate systems. For example, an autonomous vehicle may utilize images from a camera system to determine an image-based pose of an object in the environment based on an initial coordinate system, which may be an arbitrary coordinate system or a camera-based coordinate system. An arbitrary coordinate system may be based on the structure from motion functions (e.g., image matching and/or bundle adjustment) applied by the computing device. Similarly, the camera-based coordinate system may be based on the orientation and/or position of the camera.

The sensor-based pose may be based on a vehicle-based coordinate system, which may depend on the orientation and/or position of the vehicle. The sensor-based pose may also be based on the vehicle's position and/or orientation relative to a specific object in the environment, such as the object captured in the images by the vehicle's camera system.

In an example, the vehicle-based coordinate system may equal a global coordinate system that may be determined through the use of a global positioning system (GPS) associated with the vehicle.

After determining the different poses, a computing device or system associated with the autonomous vehicle may be configured to align the image-based pose with the sensor-based pose. The computing device may accomplish the alignment through the use of various processes or the application of different software and/or algorithms. Through aligning the image-based pose, the computing device may determine any adjustments that the camera system may require in order for the camera system to capture images that provide results that match the information as provided by vehicle sensors.

In one such example, a computing device or system associated with an autonomous vehicle may use transform functions to rotate, scale and/or align coordinate systems. The different poses may be determined based on coordinate systems that do not align. The computing device may use transform functions to transcribe a pose to other coordinate systems to produce the alignment. The computing device may perform rotations, reflections, scaling, transforms, or other variations to align the poses. Further, an autonomous vehicle may use multiple coordinate systems. For example, the image-based coordinate pose may be transformed by the computing device to a vehicle-based coordinate system or to a local camera-based coordinate system. The various poses may be transformed by a computing device or another entity associated with the autonomous vehicle.

In an example, an autonomous vehicle may find a transformation with least error. A computing device aligning the image-based pose and the sensor-based pose may involve the computing device determining and utilizing one or more transform functions. The computing device of an autonomous vehicle may be configured to align the coordinate system of the image-based pose to match the coordinate system of the sensor-based pose. The computing device may align the different poses to match upon the same coordinate system (e.g., camera coordinate system).

At block 310, the method 300 includes determining an adjustment of the orientation or position of the camera based on the alignment of the image-based pose with the sensor-based pose. As an example, a computing device or system associated with an autonomous vehicle may determine a rotation or position change for each camera within the vehicle camera system. In some instances, the computing device may determine an adjustment for a single camera or a number of cameras within the vehicle's camera system.

The computing device or system associated with an autonomous vehicle may find a transformation that includes a scale factor, rotation, and translation. The computing device may find the transformation with least square error. Further, the computing device may determine mechanical or electrical adjustments to perform upon vehicle systems or cameras.

An autonomous vehicle may determine adjustments to perform to a camera, such as refining the camera's focus or scaling. Further, the autonomous vehicle may also determine any variation related to the yaw, pitch, and roll of a camera. In an example, the pitch may represent adjustments of the camera up and down. The vehicle may also adjust the yaw of a camera by adjusting the camera's orientation to the left or right.

An autonomous vehicle may apply different types of adjustment to the camera system or sensor system of the vehicle. The autonomous vehicle may adjust a camera in various directions or the orientation. Further, the autonomous vehicle may adjust the roll of the camera. Other types of camera adjustments may exist as well. The computing device or system of an autonomous vehicle may adjust the position of a camera relative to the orientation or position of the vehicle. In some cases, the computing device may adjust the camera's position slightly to improve accuracy or efficiency. In addition, the computing device or system associated with an autonomous vehicle may adjust intrinsic parameters of the camera, such as focal length. The computing device may adjust intrinsic parameters based on the alignment of the vehicle pose with the camera pose.

At block 312, the method 300 includes providing instructions to one or more systems of the vehicle to configure the camera based on the adjustment. A computing device may be configured to provide instructions to different systems of the vehicle to calibrate a camera or cameras based on the adjustment of the orientation of the camera.

For example, the computer system 112 of the vehicle 100 may be configured to provide instructions to the sensor system 104 to make internal adjustments. In other examples, the computer system 112 of the vehicle 100 may provide instructions to the control system 106 of the vehicle or other systems to calibrate the camera or cameras of the vehicle 100.

In an example implementation, a camera system associated with an autonomous vehicle may capture and provide a computing device with a set of images of an object or objects. For each image in the set of images, the computing device may identify a pose including orientation of the vehicle based on a global coordinate system. The computing device may determine the pose of the vehicle using information provided by a vehicle sensor or sensors, such as the GPS module. For example, a computing device may determine the orientation of the vehicle relative to an object shown in an image based on the returns provided by a LIDAR unit.

For each image within the set of images, the computing device may be configured to determine a transform that may allow any point in each image in the global coordinate system to be transformed to the local coordinate system of the vehicle. In an example, the computing device may determine a transform function and/or an inverse transform that enables the computing device to determine any point in the local coordinate system of the vehicle to be transformed to the global coordinate system.

Given a set of images received from a camera or camera system of the vehicle, a computing device may perform feature matching and bundle adjustment on the set images. In some instances, the computing device may perform additional functions or processes relating to structure from motion to the set of images or a subset of the set images. Through performing feature matching and bundle adjustment on the set images, the computing device may determine a relative pose and orientation of the each image of the set of images to the other images in the set of images. In some instances, a computing device may determine the relative pose and orientation of the set of images based on some arbitrary coordinate system (e.g., a structure from motion coordinate system). A computing device may determine the pose of each image based on the structure from motion coordinate system.

In some instances, the computing device may estimate a 3D similarity transform between the vehicle position in global coordinates and the camera position in the structure from motion coordinate system to determine a transformation between the different coordinate systems. The computing device may use various means to determine a transformation between the structure from motion coordinate system and the global coordinate system. For example, the computing device may apply a least-squares estimation to determine the transformation parameters. The method of least squares may include determining an approximate solution for sets of equations in which there are more equations than unknowns. In operation, the computing device may use the transform to project any point between the structure from motion coordinate system and the global coordinate system.

In an example, the computing device may be determining a transform from the camera position to the vehicle-based coordinate system based on initial determinations. In other examples, the computing device of the autonomous vehicle may utilize the determined transform to project any point from the structure from motion coordinate system to the global coordinate system and the other way around (e.g., global coordinate system to structure from motion coordinate system).

Further, using the structure model, the computing device may convert any point within the structure from motion coordinate system to a camera coordinate system based on various parameters associated with a camera, such as camera rotation and camera translation matrixes. The camera coordinate system may be based on a position and orientation of the camera relative to the vehicle or other cameras. Through using the different transforms previously determined, the computing device may determine a transformation that allows projecting points from global coordinates to the camera coordinate system and the other way around. In some instances, the computing device may further determine a transform that allows the projection of points between the local vehicle coordinates and the camera coordinate system. The computing device may determine a rotation transformation from the local vehicle coordinate system to the local camera coordinate system, which may allow the computing device to estimate a rotation calibration for the cameras within the camera system.

In an example implementation, a computing device or system associated with an autonomous vehicle may be configured to determine a similarity transform, which includes a rotation, scale, and translation factor to align coordinate systems.

Within examples, an autonomous vehicle may use structure from motion to determine adjustments for the camera system. Among different functions, structure from motion may include a computing device performing various processes to estimate three-dimensional (3D) structures from two-dimensional (2D) images. For example, the computing device of an autonomous vehicle may receive a series of images that each capture a different angle of an object (e.g., a building) as the autonomous vehicle travels by the object. The movement of the vehicle will cause the camera system to capture images that may appear similar, but do not show the object in exactly the same way. The computing device may be configured to track features, such as corners or line segments in a series of images based on a particular object or set of objects and may use the information to estimate motion and structure. In addition, the computing device or system associated with the autonomous vehicle may receive the various images from the camera system and apply a search algorithm that groups images that depict the same object. For example, a computing device may execute an image-matching algorithm that analyzes the various images received from the camera system to find all the images that display different angles of a particular building. Through application of an image-matching process, a computing device may identify images from the numerous images received that may be useful for calibrating a camera or cameras of the camera system.

In addition, through using the estimated motion and structure, the computing device may further refine estimates of structure of objects. The computing device or system associated with the autonomous vehicle may be configured to perform other functions and/or processes relating to structure from motion. For example, a computing device may execute a bundle adjustment process. Given a set of images depicting a number of 3D points from different viewpoints, bundle adjustment may be defined as the problem of simultaneously refining the 3D coordinates describing the scene geometry as well as the parameters of the relative motion and the optical characteristics of the camera(s) utilized to capture the images, according to an optimality criterion involving the corresponding image projections of all points. A computing device may apply bundle adjustment to images in order to execute a feature-based 3D reconstruction of the object in the images. The computing device may focus upon features or specific points of the object throughout the group of images to execute the bundle adjustment process. In other examples, the computing device or system of an autonomous vehicle may be configured to perform additional functions relating to structure from motion.

After aligning the image-based pose with the sensor-based pose, the computing device or system associated with the autonomous vehicle may determine adjustments to perform on the orientation and/or position of cameras based on the alignment of the image-based pose with the sensor-based pose. For example, the computing device may calibrate a camera or cameras within the camera system through various adjustments, such as altering the rotation, translation, roll, pitch, and/or yaw of the position or orientation of camera relative to the position or orientation of the vehicle. The computing device may calibrate the cameras based on the differences between the image-based pose and the vehicle-based pose.

In an example implementation, the autonomous vehicle may improve precision of cameras through calibration. The autonomous vehicle may adjust parameters of a camera, such as translation in x, y, z-coordinates, and rotation angles (e.g., yaw, pitch, and roll). The autonomous vehicle may adjust other parameters associated with a camera as well. Further, an autonomous vehicle may use information from sensors, such as GPS measurements, inertial measurements, and image measurements to determine a position of the vehicle as time progresses.

Figure 4:
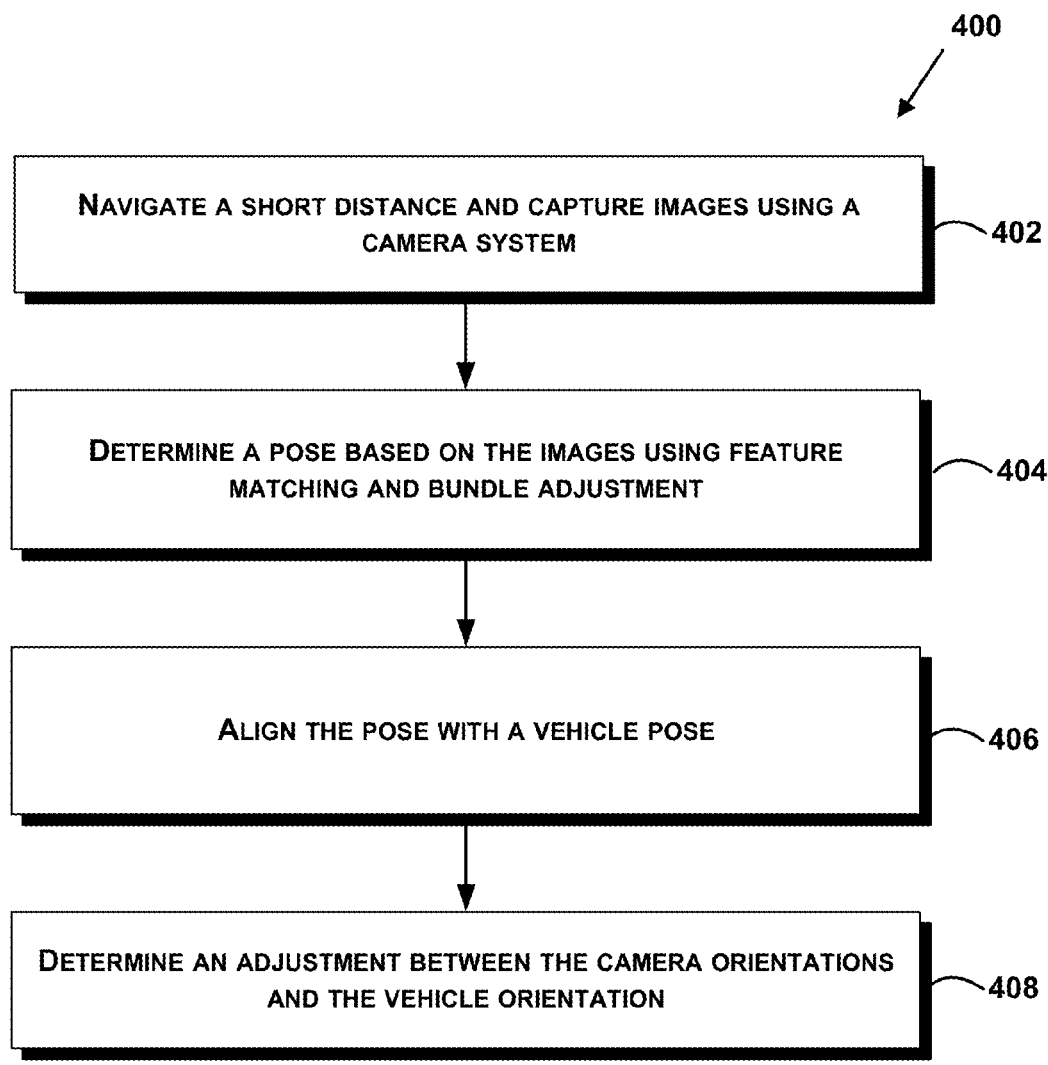
FIG. 4 is another block diagram of an example method for camera calibration using structure from motion techniques, in accordance with at least some embodiments described herein.

FIG. 4 is block diagram of another example method for camera calibration using structure from motion techniques. Method 400 shown in FIG. 4 presents an embodiment of another method that, for example, could be used with the vehicle 100 and/or vehicle 200 as illustrated and described in reference to FIGS. 1 and 2, respectively, or components of the vehicle 100 or vehicle 200. Method 400 may include one or more operations, functions, or actions as illustrated by one or more of blocks 402-408. Method 400 may also be performed in addition to method 300 by an autonomous vehicle. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method 400 includes navigating a short distance and capturing images using a camera system. With an autonomous vehicle determining to calibrate a camera or cameras, the autonomous vehicle may continue a path of travel while capturing images with the camera system. The autonomous vehicle may be configured to navigate a short distance and capture the images without user assistance or intervention.

In one such example, an autonomous vehicle may navigate a short curved road to execute the camera calibration. During travel, the autonomous vehicle may use various systems to assist in navigation, such as control systems and sensor systems. In some instances, an autonomous vehicle may utilize a camera system to capture images of the environment surrounding the vehicle. The autonomous vehicle may navigate a short distance while capturing images. Moreover, the vehicle may also capture images continually throughout navigation. Since the vehicle may be traveling, the various images captured by the camera system may show objects from different points of view and orientations.

In a specific example, an autonomous vehicle or another entity may determine an image-based pose through capturing images with a camera system that may contain any number of cameras. The number of cameras within the camera system may vary and affect the precision and accuracy of the system as a whole. The cameras may be positioned at different points on the autonomous vehicle to capture different images of objects at various positions relative to the vehicle. The cameras may also have different orientations, which may depend on the position on the camera relative to the vehicle. The autonomous vehicle may be configured to adjust the various parameters of the camera system through mechanical and/or electrical systems.

At block 404, the method 400 includes determining a pose based on the images using feature matching and bundle adjustment. As previously discussed in method 300, an autonomous vehicle may apply functions pertaining to structure from motion to determine a pose based on the images captured by the vehicle's camera system. The autonomous vehicle may utilize other functions related to structure from motion to determine a pose that may pertain to the camera and/or object based on the images.

A computing device may use image matching and/or feature matching to determine a set or subset of images to use to calibrate cameras. During navigation, a vehicle's camera system may capture hundreds, thousands, or even more images during a period of travel. A computing device or system associated with the vehicle may receive the images and use feature matching or image matching to identify a subset of the images received that may be useful for calibrating a particular camera or cameras. The computing device or system may select images for the subset of images to use by searching for images that display the same object or objects. The computing device or system may factor the speed of the vehicle and/or the specific times the images are captured to link similar images together. The similar images may display the same object, such as a building, from slightly different points of views due to the vehicle traveling by the object.

In addition, a computing device or system of an autonomous vehicle may use the subset of images to perform bundle adjustment, which may include mapping 3D points within the images according to points as shown by the building. The computing device may adjust the positions of the 3D points within the images based on receiving additional angles of the object through receiving more images for analysis. The computing device may further minimize error by performing bundle adjustment subsequent times. The computing device may bundle greater numbers of images to increase the accuracy of the image-pose determined for the object.

A computing device or system associated with an autonomous vehicle may additionally execute more processes relating to structure from motion. The computing device may use other image analysis techniques as well.

At block 406, the method 400 includes aligning the pose with a vehicle pose. During navigation, an autonomous vehicle may determine a sensor-based pose through obtaining information from a sensor system associated with the vehicle.

The sensor-based pose may describe the orientation of the vehicle. In some examples, the sensor-based pose may describe additional parameters associated with the vehicle, such as a position, speed, and distance away from certain objects. The sensor system may include, for example, a RADAR system, LIDAR unit, GPS, or other types of sensors.

The autonomous vehicle may use various systems, software, and/or algorithms to transform the pose from the images onto the vehicle pose. In some examples, the computing device may apply multiple transforms to align the poses for comparison and calibration purposes. The vehicle sensors may allow the computing device to determine the orientation and/or other parameters associated with the vehicle relative to global coordinates and/or some other coordinate system. In one such example, a computing device or system associated with an autonomous vehicle may apply various alignment means to align the image-based pose with sensor-based pose. The alignment means may include rotations, scaling, and/or transforms, for example.

In one such example, a computing device of an autonomous vehicle may perform the alignment through utilizing different algorithms and/or transforms. For example, the autonomous vehicle may use a transform or multiple transforms to align the pose based on the camera images with the pose of the vehicle as determined by the vehicle sensors. Other examples may exist as well.

At block 408, the method 400 includes determining an adjustment between the camera orientations and the vehicle orientation. The autonomous vehicle may determine various adjustments to perform on a camera or cameras associated with the vehicle, which may include rotations, translations, or other adjustments to the camera or cameras. As discussed under method 300, the autonomous vehicle may apply various adjustments to the orientation of a camera or cameras within the vehicle camera system. The autonomous vehicle may adjust various parameters associated with each camera attached to the vehicle including the positioning. Various systems (e.g., mechanical and/or electrical) may be utilized to automatically adjust (e.g., calibrate) the extrinsic parameters of the cameras and may also adjust intrinsic parameters of a camera or cameras. A computing device may analyze the subtle or significant differences as shown between the poses in order to determine adjustments that the computing device may apply to a camera or cameras. In some cases, an autonomous vehicle may not adjust a camera if the difference is below a threshold level.

In an example implementation, a computing device or system associated with an autonomous vehicle may perform additional calibration processes.

Figure 5:
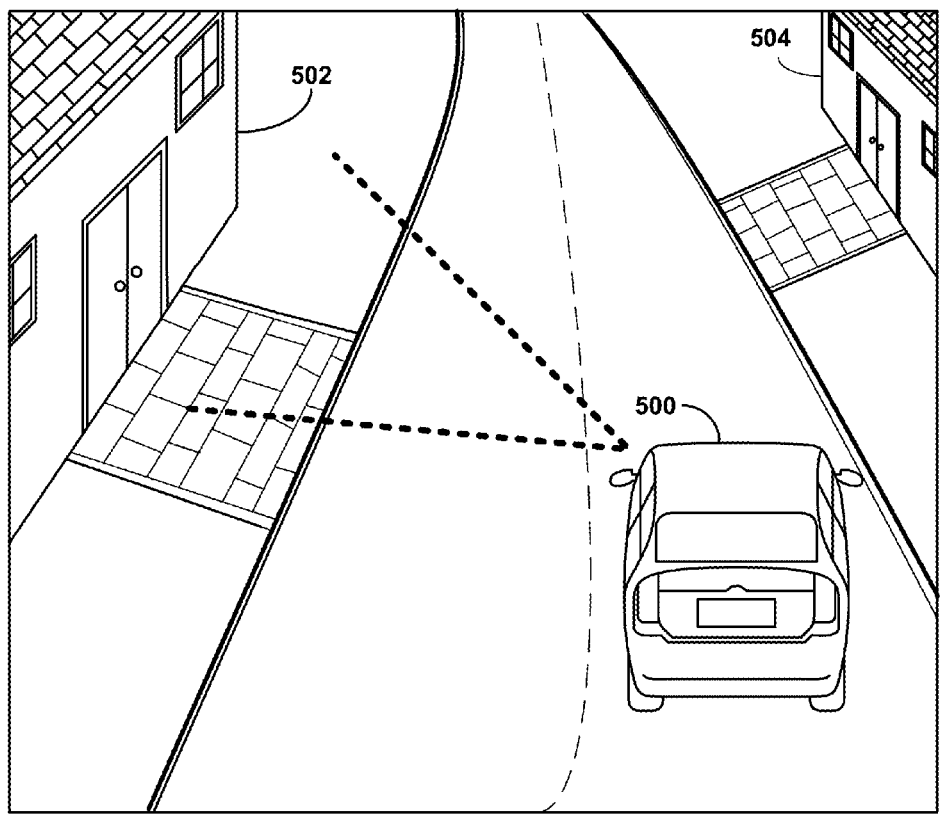
FIG. 5 is a conceptual illustration of an example vehicle performing camera calibration using structure from motion techniques, in accordance with at least some embodiments described herein.

FIG. 5 is a conceptual illustration of an example for camera calibration using structure from motion techniques. As shown in FIG. 5, the example illustration includes an autonomous vehicle 500 navigating along a road. Additionally, FIG. 5 also includes buildings 502-504 positioned along the road for illustration purposes.

Within the example shown in FIG. 5, as the autonomous vehicle 500 navigates the road, a camera system associated with the vehicle may capture various images of objects in the vehicle's surrounding environment, which may include images showing the building 502-504, lane markers, street signs, or other objects, etc. After capturing images by the camera system, the autonomous vehicle 500 may include a computing device or system that is configured to calibrate the vehicle's cameras through using the images and structure from motion to determine adjustments to perform upon the cameras. The computing device or system associated with the autonomous vehicle 500 may calibrate vehicle cameras through executing method 300 or method 400 as discussed within FIGS. 3-4. In order to make adjustments to a camera or cameras, the autonomous vehicle 500 may include various systems (mechanical and electrical) which may assist in executing structure from motion processes.

In the example, the autonomous vehicle 500 may receive a series of images of the building 502 or building 504. A computing device or system associated with the autonomous vehicle 500 may receive the images captured by the vehicle's camera system through wireless or wired transmission. As captured by the vehicle's cameras, the images may show the buildings 502-504 with other objects or may focus upon the only the building. The cameras may be configured to scale and focus images to capture specific details of objects.

Moreover, some of the images may show portions of the buildings, which may be used or not used by the computing device or system of the autonomous vehicle to calibrate cameras. In such an example, the camera system of the vehicle may capture multiple pictures of the building 502 from different angles as the autonomous vehicle drives by the building. The buildings 502-504 represent average, non-specific buildings, but may represent other objects that may be found in the environment of the vehicle (e.g., bridges, traffic signs). While capturing images, the autonomous vehicle may take into account the speed of the vehicle and associate the speed with the images. In one such example, the cameras may factor in the vehicle's speed or position to capture more clear and accurate images.

In other examples, various types of vehicles may replace the autonomous vehicle 500. For example, an autonomous boat may use a camera system to assist in navigating an aqueous path. In addition, the autonomous vehicle may include different types of cameras and/or sensors. The components that make up a vehicle may vary within different systems. For example, the autonomous vehicle may include a system that includes video cameras, omnidirectional cameras, or still cameras. Other types of cameras may be included as well as discussed in the previous figures.

During operation, an autonomous vehicle, such as autonomous vehicle 500, may utilize various software processes or algorithms. The different processes may be executed by a processor or computing device and/or system associated with the autonomous vehicle. The autonomous vehicle may factor the speed of the vehicle with the software processes and/or algorithms used pertaining to structure from motion. For example, the autonomous vehicle may utilize an image matching algorithm to differentiate images of the building 502 from other images taken by the camera system that capture other objects.

In an example implementation, the autonomous vehicle may use a tracking system or a similar functioning system to identify and track features of an object across a series of images. A feature matching function may allow a computing device to determine which images to utilize for bundle adjustment. As discussed, the computing device may apply the feature matching software to identify objects across images and perform additional organizational techniques.

The computing device may identify useful features based on particular objects captured within the images. For example, the autonomous vehicle may track points of an object that are distinct from the majority of the object, such as corners, different colors, specific portions of an object, etc. The autonomous vehicle may use the different distinct features to organize images captured by the camera system. For example, the autonomous vehicle may use features to differentiate images that show building 502 compared to the images that show building 504.

Moreover, the autonomous vehicle may utilize processes in addition to feature matching. For example, the autonomous vehicle may apply a bundle adjustment process through using systems of the vehicle. A computing device or system associated with the autonomous vehicle may determine poses of objects within images using bundle adjustment. In such examples, the computing device may use nonlinear least-square algorithms or other functions to refine the 3D coordinates describing the scene geometry as well as parameters of the relative motion and the optical characteristics of the camera(s) used to acquire the images. The autonomous vehicle may determine image projections of all the points. The computing device may further determine camera pose and possibly intrinsic calibration and radial distortion using bundle adjustment to form a reconstruction. Further, the computing device may utilize bundle adjustment to determine the orientation of the camera and/or position relative to the vehicle, some object, or based on a different coordinate system. The computing device may utilize bundle adjustment as such means to recover image pose.

The autonomous vehicle may determine a pose of the building 502 as provided by images captured by the camera. The pose may describe the orientation and position of the building as according to the images captured by the camera system. Further, the autonomous vehicle may also determine other parameters through configuring the images. The autonomous vehicle may determine the camera pose utilizing the images and structure from motion functions.

Different sensors associated with the autonomous vehicle may provide information to determine a sensor-based pose. The autonomous vehicle may receive information from GPS measurements, LIDAR returns, RADAR scans, or other sensors to determine an orientation and/or position of the vehicle. Other parameters of the vehicle may be determined through using the sensor information as well. The sensor-based pose of the vehicle may be determined relative to a different coordinate system than the image-based pose. The image-based pose may be based on a camera coordinate system or an arbitrary coordinate system relating to the structure from motion functions. The sensor-based pose may be based on a vehicle-coordinate system or a global coordinate system, for example.

The autonomous vehicle may compare the different poses to determine variations between the camera images and sensor information. Further, the autonomous vehicle may align the image-based pose with the image-based pose to determine adjustments to perform on the camera(s) within the camera system. The autonomous vehicle may align the image-based pose and sensor-based pose through utilizing mathematical transforms. The autonomous vehicle may apply transforms or other rotations and/or translations to match the coordinate systems. For example, a computing device may use multiple transforms to change the image-based pose from an arbitrary coordinate system to a camera coordinate system that allows relative measurements and adjustments to be estimated by the computing device. Through various alignment processes and transforms, a computing device may determine any adjustments necessary to calibrate a camera or camera system of the autonomous vehicle. The autonomous vehicle 500 may utilize various algorithms and/or software functions to align the coordinate systems of the poses. For example, a computing device associated with vehicle 500 may execute a transform to align coordinate systems of the different poses. The computing device of the autonomous vehicle 500 may align the different determined poses through rotation, scaling, and/or transforms, for example.

Using the aligned image-based pose and sensor-based pose, the autonomous vehicle may determine any adjustments that the vehicle may apply on a camera or cameras within the camera system. The autonomous vehicle 500 may additionally determine an orientation, position, or other parameters associated with the autonomous vehicle through the use of vehicle sensors. For example, the various sensors associated with the autonomous vehicle (e.g., LIDAR, RADAR, GPS) may provide the autonomous vehicle with information that allows a computing device to determine the pose of the vehicle. The computing device may determine the pose of the vehicle relative to an object or objects, which may include the objects that the camera system focused upon.

In a similar example, the computing device of autonomous vehicle 500 may use the 3D point cloud extracted from images captured by the camera system and compare the 3D point cloud with another 3D point cloud determined by a vehicle sensor (e.g., LIDAR). The computing device may align the 3D point clouds to extract information relating to the necessary adjustments the camera system may require. Likewise, the computing device may use the aligned 3D point clouds to provide information that may be used to calibrate the vehicle sensors.

Within examples, the autonomous vehicle 500 may apply different adjustments to the camera system including adjustments relating to rotation, scaling, roll, pitch, and/or yaw. The various adjustments may impact the accuracy and/or precision of the camera system. The computing device may be configured to calibrate multiple cameras simultaneously.

In an example, the autonomous vehicle 500 may use different objects to calibrate the cameras within the camera system. For example, the autonomous vehicle 500 may capture images of bridges, lane markers, traffic signs, trees, or other objects to calibrate vehicle cameras. The autonomous vehicle may utilize other systems or methods described herein to calibrate vehicle cameras to provide accurate images.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
   receiving, at a computing device via a camera coupled at an orientation and position to a vehicle autonomously navigating a path in an environment, a plurality of images indicative of a plurality of objects positioned within a threshold distance from the path in the environment of the vehicle during a respective time range;

based on the plurality of images, determining, by the computing device, an image-based pose indicative of the orientation and position of the camera;

receiving from one or more laser-based sensors coupled to the vehicle as the vehicle navigates the path in the environment, sensor data indicative of an orientation and position of the vehicle relative to the plurality of objects positioned within the threshold distance from the path in the environment of the vehicle during the respective time range;

based on the sensor data, determining a sensor-based pose indicative of the orientation and position of the vehicle relative to the plurality of objects in the environment, wherein both the sensor-based pose and the image-based pose correspond to the respective time range;

aligning, by the computing device as the vehicle navigates the path in the environment, a camera-based coordinate system of the image-based pose with a vehicle-based coordinate system of the sensor-based pose using one or more of a transform, rotation, and scaling modification;

determining an adjustment for the orientation or position of the camera based on the alignment of the camera-based coordinate system of the image-based pose with the vehicle-based coordinate system of the sensor-based pose; and causing, by the computing device as the vehicle navigates the path in the environment, calibration of the camera based on the adjustment.

2. The method of claim 1, wherein aligning the image-based pose with the sensor-based pose includes aligning a first 3D point cloud indicative of the image-based pose with a second 3D point cloud indicative of the sensor-based pose.

3. The method of claim 1, wherein the image-based pose is based on a camera-based coordinate system and the sensor-based pose is based on a vehicle-based coordinate system.

4. The method of claim 3, wherein the camera-based coordinate system differs from the vehicle-based coordinate system.

5. The method of claim 1, wherein receiving from one or more sensors coupled to the vehicle, sensor data indicative of the orientation and position of the vehicle relative to the plurality objects in the environment of the vehicle during the respective time range comprises:

receiving sensor data from a plurality of sensors comprising a combination of two or more of RADAR, LIDAR, and a global positioning system (GPS).

6. The method of claim 1, wherein determining the adjustment of the orientation or position of the camera based on the alignment of the image-based pose with the sensor-based pose comprises:

determining one or more adjustments to a rotation or translation of the camera relative to the orientation and position of the vehicle.

7. A system comprising:
at least one processor; and
a memory having stored thereon instructions that, upon execution by the at least one processor, cause the system to perform functions comprising:
receiving, via a camera coupled at an orientation and position to a vehicle autonomously navigating a path in an environment, a plurality of images indicative of a plurality of objects positioned within a threshold distance from the path in the environment of the vehicle during a respective time range;
based on the plurality of images, determining an image-based pose indicative of the orientation and position of the camera;
receiving from one or more laser-based sensors coupled to the vehicle as the vehicle navigates the path in the environment, sensor data indicative of an orientation and position of the vehicle relative to the plurality of objects positioned within the threshold distance from the path in the environment of the vehicle during the respective time range;
based on the sensor data, determining a sensor-based pose indicative of the orientation and position of the vehicle relative to the plurality of objects in the environment, wherein both the sensor-based pose and the image-based pose correspond to the respective time range;
aligning, as the vehicle autonomously navigates the path in the environment, a camera-based coordinate system of the image-based pose with a vehicle-based coordinate system of the sensor-based pose using one or more of a transform, rotation, and scaling;
determining an adjustment for the orientation or position of the camera based on the alignment of the camera-based coordinate system of the image-based pose with the vehicle-based coordinate system of the sensor-based pose; and
causing, as the vehicle navigates the path in the environment, calibration of the camera based on the adjustment.

8. The system of claim 7, wherein determining the image-based pose indicative of the orientation and position of the camera includes determining a set of useful images for determining the image-based pose through image matching, wherein each image in the set of useful images displays a constant object.

9. The system of claim 7, wherein determining the image-based pose indicative of the orientation and position of the camera includes determining a set of three-dimensional points within the images indicative of an object in the environment; and adjusting the set of three-dimensional points to determine the image-based pose indicative of an orientation and position of the camera relative to the plurality of objects in the environment.

10. The system of claim 9, wherein the camera-based coordinate system differs from the vehicle-based coordinate system.

11. The system of claim 7, wherein the function of determining, via at least one sensor coupled to the vehicle, a sensor-based pose comprises:

using one or more of RADAR, LIDAR, or a global positioning system (GPS).

12. The system of claim 7, wherein determining the adjustment of the orientation or position of the camera based on the alignment of the image-based pose with the sensor-based pose comprises:

determining one or more adjustments to a rotation or translation of the camera relative to the orientation and position of the vehicle.

13. A non-transitory computer readable medium having stored thereon instructions that, upon execution by a computing device, cause the computing device to perform functions comprising:

receiving, via a camera coupled at an orientation and position to a vehicle autonomously navigating a path in an environment, a plurality of images indicative of a plurality of objects positioned within a threshold distance from the path in the environment of the vehicle during a respective time range;

based on the plurality of images, determining an image-based pose indicative of the orientation and position of the camera;

receiving from one or more laser-based sensors coupled to the vehicle as the vehicle navigates the path in the environment, sensor data indicative of an orientation and position of the vehicle relative to the plurality of objects positioned within the threshold distance from the path in the environment of the vehicle during the respective time range;

based on the sensor data, determining a sensor-based pose indicative of the orientation and position of the vehicle relative to the plurality of objects in the environment, wherein both the sensor-based pose and the image-based pose correspond to the respective time range;

aligning, as the vehicle autonomously navigates the path in the environment, a camera-based coordinate system of the image-based pose with a vehicle-based coordinate system of the sensor-based pose using one or more of a transform, rotation, and scaling;

determining an adjustment for the orientation or position of the camera based on the alignment of the camera-based coordinate system of the image-based pose with the vehicle-based coordinate system of the sensor-based pose; and causing, as the vehicle navigates the path in the environment, calibration of the camera based on the adjustment.

14. The non-transitory computer readable medium of claim 13, wherein determining the image-based pose indicative of the orientation and position of the camera includes determining a set of three-dimensional points within the images indicative of an object in the environment; and adjusting the set of three-dimensional points to determine the image-based pose indicative of an orientation and position of the camera relative to the object in the environment.

15. The non-transitory computer readable medium of claim 13, wherein the image-based pose is based on a camera-based coordinate system and the sensor-based pose is based on a vehicle-based coordinate system.

16. The non-transitory computer readable medium of claim 15, wherein the camera-based coordinate system differs from the vehicle-based coordinate system.

17. The non-transitory computer readable medium of claim 13, wherein determining the adjustment for the orientation or position of the camera based on the alignment of the image-based pose with the sensor-based pose comprises:

determining one or more adjustments to a rotation or translation of the camera relative to the orientation and position of the vehicle.

\* \* \* \* \*